TONE-FREE MULTIPLEXING SYSTEM USING A DELTA MODULATOR

Filed March 13, 1967 2 Sheets-Sheet 1

INVENTOR
PHILIP R. SHERIDAN
BY
ATTORNEY

TONE-FREE MULTIPLEXING SYSTEM USING A DELTA MODULATOR

Filed March 13, 1967 2 Sheets-Sheet 2

INVENTOR
PHILIP R. SHERIDAN
BY
ATTORNEY 3,491,206
TONE-FREE MULTIPLEXING SYSTEM USING A DELTA MODULATOR

Philip R. Sheridan, Baltimore, Md., assignor to The Bendix Corporation, a corporation of Delaware
Filed Mar. 13, 1967, Ser. No. 622,536
Int. Cl. H04j 3/02
U.S. Cl. 179—15 10 Claims

ABSTRACT OF THE DISCLOSURE

A means of time multiplexing digital data into individual periodically preempted bit spaces of the binary output of a delta modulator and demultiplexing without introducing multiplexing tones into the demodulated analog output. At preemption time the binary output of the delta modulator is made to complement and the output of the demultiplexer is made to assume the complement of the preceding bit.

Background of the invention

Delta modulators are well known in the art as analog-to-digital converters, normally used for converting an audio signal into a serial binary bit stream by continous comparison of the integral of the binary output with the analog input signal and modification of the binary output stream in accordance with the results of the comparison. The serial binary bit stream is transmitted to a remote receiver where the received signal is standardized and demodulated by integration and filtered to reproduce the analog input.

Digital data can be multiplexed with the digitized analog signal by simple time division multiplexing. Up to 10% of the available time slots at a 38.4 kHz. clock rate can be preempted by multiplexed data without noticeable degradation of the analog transmission. This multiplexing is conveniently accomplished by peridocially preempting the time slot of an individual bit and inserting a single bit of the data to be multiplexed. These periodically preempted time slots, however, produce an objectionable audio tone, at a frequency inversely proportional to the spacing between the preempted time slots, in the recovered analog signal when the input analog signal is very low or zero such as would occur during momentary pauses in a voice transmission. In order to understand how this objectionable tone is generated by the multiplexing system, it is necessary at this time to briefly describe the operation of a delta modulator with special consideration of such operation at zero analog input.

As has been previously stated, delta modulation is a method of converting analog signals into binary signals. The output of the delta modulator is, therefore, in the form of logical "1's" or "0's". The output is fed back through an integrator and continuously compared with the analog input signal. If the magnitude of the analog input is higher than the magnitude of the integrated feedback signal, the delta modulator will produce a logical "1" output which will cause the integrated feedback signal to increase. If the magnitude of the analog input signal is lower than the magnitude of the integrated feedback signal, the delta modulator will produce a logcial "0" output which will cause the integrated feedback signal to decrease. The results of the signal comparison are sampled at a digital clock rate, a single bit being held in the period between clock pulses.

In a practical system, logical "1" is a higher voltage level representing maximum positive input analog voltage and logical "0" is a lower voltage level representing maximum negative input analog voltage. The zero analog condition is represented by a voltage level midway between logical "1" and "0." It is therefore apparent, that at zero analog input, the delta modulator output will consist of a stream of alternate "1's" and "0's", the integral of which produces an approximate sine wave the average value of which corresponds to the zero analog voltage level and at a frequency equal to the digital sampling rate. Digital sampling rate in the present example is 38.4 kHz. which is well above the audio frequency level so that no audio tones are present in the unmultiplexed demodulated digital stream corresponding to zero analog input.

Now, if 10% of the time slots are preempted for multiplexing digital data into the binary stream and the digital data consists of "1's" and "0's" and there is a zero analog input, it is obvious that it is possible that a preempted bit which might have been a logical "1" had the binary stream been unmultiplexd, will be a logical "0" and conversely, a preempted bit which might have been a logical "0" might be a logical "1." The multiplexed stream, upon being demultiplexed will have certain of the preempted spaces of a logical sense inconsistent with demodulation to zero analog level. Since the preempted time slots occupy 10% of the total time slots which are occuring at a rate of 38.4 kHz., these preempted bits occur at a 3840 Hz. rate, but not every preempted bit is inconsistent with a zero analog signal. Inconsistent bits will occur at lower frequencies, all of which will fall into the audio frequency band upon being demodulated and therefore cannot be filtered from the demodulated signal. These audio tones are especially noticeable during pauses in voice transmissions and have been found to be objectionable. Of course, the preempted bits mays be divided into recurrent sub-groupings which have a lower repetition rate within the sub-group, thereby causing lower frequency tones. The actual tone frequencies will depend on the individual multiplexing scheme.

Summary of the invention

To prevent the occurrence of the audio multiplexing tones it is necessary for the demultiplexed binary signal applied to the demodulator at the receiver to be identical to the binary feedback to the integrator in the delta modulator and additionally, for the binary signal for zero analog input (the delta modulator idle pattern) to be the same with and without multiplexing, that is, the delta modulator binary output consist of alternate logcial "1's" and "0's" at zero analog input.

Assume that the output of the delta modulator consists of a binary stream of bits designated as bits P, $P+1$, . . . P$n$ . . . , $P-1$, P, etc., where bit P occurs at preemption time P and bits P$n$ occur at all other times $\overline{P}$. The concept of time $\overline{P}$ contains times $P-1$, P1, etc., where bit $P-1$ occurs immediately prior to bit P and bit P1 occurs immediately after bit P.

Accordingly, at P time, the delta modulator binary output is forced to complement, or arbitrarily change states. In other words, at P time, the delta modulator binary output must assume a logical state opposite to the logical state existing at time $P-1$.

At the receiving end, a shift register is employed to store two consecutive bits with the second stored bit complemented or inverted in a logic sense.

Normally at any time $\overline{P}$, output is taken from the first stage of the shift register; however, at time P, output is taken from the second stage. Since at time P the shift register contains in its first stage the bit corresponding to time P and in its second stage the bit corresponding to time $P-1$ inverted, the output stream of the shift register is identical to the delta modulator binary stream output thereby satisfying the aforementioned requirements for a tone-free, minimally distorted, digitally multiplexed system.

It is therefore an object of the present invention to devise a means in a digital multiplexing system using a delta modulator to produce one of the binary streams from an audio signal, to eliminate the objectionable audio tone in the demultiplexed and demodulated audio output characteristic of such a system at zero audio input.

Description of the preferred embodiment

Figure 1:
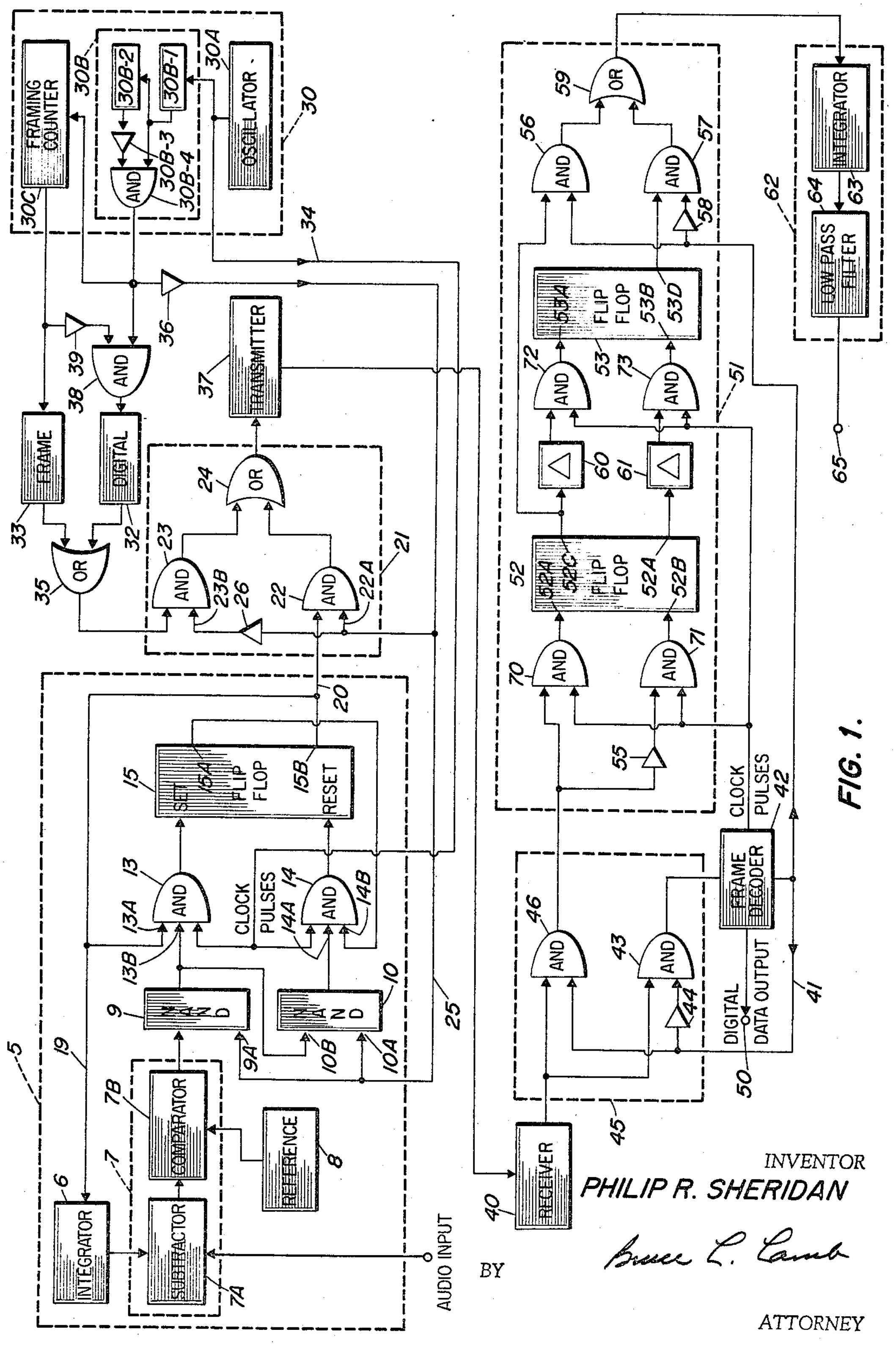
FIG. 1 is a block diagram of the subject invention.

Referring to FIG. 1, a delta modulator 5 receives an audio input signal which is applied to the subtractor 7A of differential comparator 7. A binary feedback signal, which is the digitized analog output of the delta modulator appearing at output terminal 20, is connected to integrator 6 wherein it is integrated and the integrated signal is also applied to subtractor 7A. These two signals, thee integrated feedback and the audio input, are combined in the subtractor in such a fashion that their difference in amplitude appears at the output of the subtractor and this is applied to comparator 7B which functions as a threshold detector, comparing the output of subtractor 7A with a threshold voltage supplied by voltage source 8. This threshold level may be ground or some low voltage. The differential comparator 7 output indicates whether the integrated binary feedback voltage is instantaneously greater or less than the analog input voltage and is in the form of a binary level status signal which assumes a logical "1" level when the analog input is larger than the integrated feedback and a logical "0" level when integrated feedback is larger. NAND gate 9 receives the differential comparator 7 output. During the time that the digitized analog signal is being transmitted, a logical "1" appears at terminal 9A of NAND gate 9, as will be explained below, thereby allowing the differential comparator output inverted to pass to AND gate 13 and to terminal 10B of NAND gate 10. Similarly, a logical "1" appears at terminal 10A of gate 10. In this state, the output of gate 10 will be of the same logical sense as the output of differential comparator 7. The output of gate 9 is fed to the SET terminal of flip-flop 15, through AND gate 13. The state of the differential comparator 7 output is sampled by clock pulses applied to gates 13 and 14 supplied by oscillator 30A, occurring at a clock rate, in this embodiment, of 38.4 kHz. If the level comparator output indicates that the integrated binary feedback voltage is less than the analog input signal voltage a logical "0" appears at gate terminal 13B and a logical "1" appears at gate terminal 14A as has previously been discussed. If a clock pulse is now applied to gates 13 and 14 and flip-flop 15 is in the set state, that is, with terminal 15A at a logical "1" level so that a logical "1" is applied to AND gate terminal 14B, then a logical "1" will be applied to the reset terminal of flip-flop 15 causing it to complement into the reset state, that is, with a logical "1" at terminal 15B and hence at output terminal 20 and on feedback line 19. If, however, at the time the clock pulse is applied to gates 13 and 14, flip-flop 15 is in the reset state, that is, with terminal 15A at a logical "0" level so that a logical "0" is applied to terminal 14B of gate 14, then no signal will pass through gates 13 and 14. The flip-flop will remain in the reset state satisfying the requirement that the delta modulator produce a logical "1" whenever the analog input is larger than the integrated feedback. Likewise, the delta modulator output will be a logical "0" whenever the integrated feedback voltage is more than the analog input voltage. Under this condition, comparator 7B output is a logical "0" so that a logical "1" appears at terminal 13B of gate 13 and a lgoical "0" at terminal 14A of gate 14, effectively disabling gate 14. If flip-flop terminal 15B is a logical "1," a logical "1" also appears on terminal 13A, so that a clock pulse applied to gate 13 will cause the flip-flop to complement into the set state with a logical "0" on terminal 15B. If a logical "0" is already on terminal 15B, gate 13 is also disabled and a clock pulse will not effect the flip-flop.

At preemption time P, a preemption bit at logical level "0" appears on line 25 and at NAND gate terminals 9A and 10A, forcing both NAND gates 9 and 10 to logical level "1." When a clock pulse is now applied to gates 13 and 14, flip-flop 15 will be forced to complement since gate 13 will be enabled if flip-flop 15 is in the reset state, thereby forcing it into the set state and gate 14 will be enabled if flip-flop 15 is in the set state, thereby forcing it into the reset state. The complemented bit is fed back to integrator 6 but is not used by the multiplexer 21 as AND gate 22 has been inhibited by the appearance of the "0" level bit at gate terminal 22A at time P.

It should now be apparent that gates 9, 10, 13 and 14 are not necessary to the unmultiplexed operation of a delta modulator. The output of differential comparator 7 could be applied directly to a pulse gate and sampled at the clock rate. Gates 9, 10, 13 and 14 have been added to force the flip-flop to complement at preemption time P, a vital function for a tone-free multiplexed digital system. Although the gates have been shown as discrete logical blocks, it should be obvious to one skilled in the art that through judicious circuit design certain of the physical circuits required can be combined while still retaining the logic disclosed. Specifically, using present day integrated circuit techniques in a practical system, flip-flop 15 can be combined with gates 13 and 14 into a pulse steering flip-flop having a logic block diagram identical to that disclosed.

At time $\overline{P}$ a logical "1" is on line 25 and terminal 22A enabling gate 22 and allowing the delta modulator output to pass through gate 22 to OR gate 24. Also at time $\overline{P}$, inverter 26 inverts the signal from line 25 and applies a logical "0" at terminal 23B, inhibiting gate 23. At time P gate 22 in inhibited and gate 23 is enabled whereby either digital data derived from data generator 32 or framing information derived from framing generator 33 will be allowed to pass through gate 23 and gate 24.

A clock 30 typically includes a stable oscillator 30A generating clock pulses at a 38.4 kHz. rate which are supplied directly to gates 13 and 14 as aforementioned. Additionally, the clock pulses are applied to preemption counter 30B which generates pulses at time P which are inverted by inverter 36 to produce the preemption pulse at logical level "0" appearing on line 25 at time P and the signal at logical level "1" appearing on line 25 at time $\overline{P}$.

The preemption counter output is also applied to AND gate 38 and framing counter 30C. Framing counter 30C produces an output pulse every sixth preemption pulse. Framing counter output is inverted by inverter 39 so as to disable gate 38, thereby blocking every sixth preemption pulse from the digital data generator 32. Framing counter output is also applied to frame generator 33 which thereby produces a frame bit which is multiplexed into the delta modulator output stream by OR gates 35 and 24 and AND gate 23 which is enabled simultaneously with the production of the frame bit by the preemption pulse on line 25.

Preemption counter output pulses which do not produce a framing counter output are able to pass through gate 38 to digital data generator 32 which thereby produces a single data bit. The generator data bit is multiplexed into the delta modulator output stream by the identical mechanism as mentioned above for multiplexing framing bits into the delta modulator output stream, that is, the simultaneous production of a data bit and enabling of gate 23 by a preemption pulse.

Figure 2:
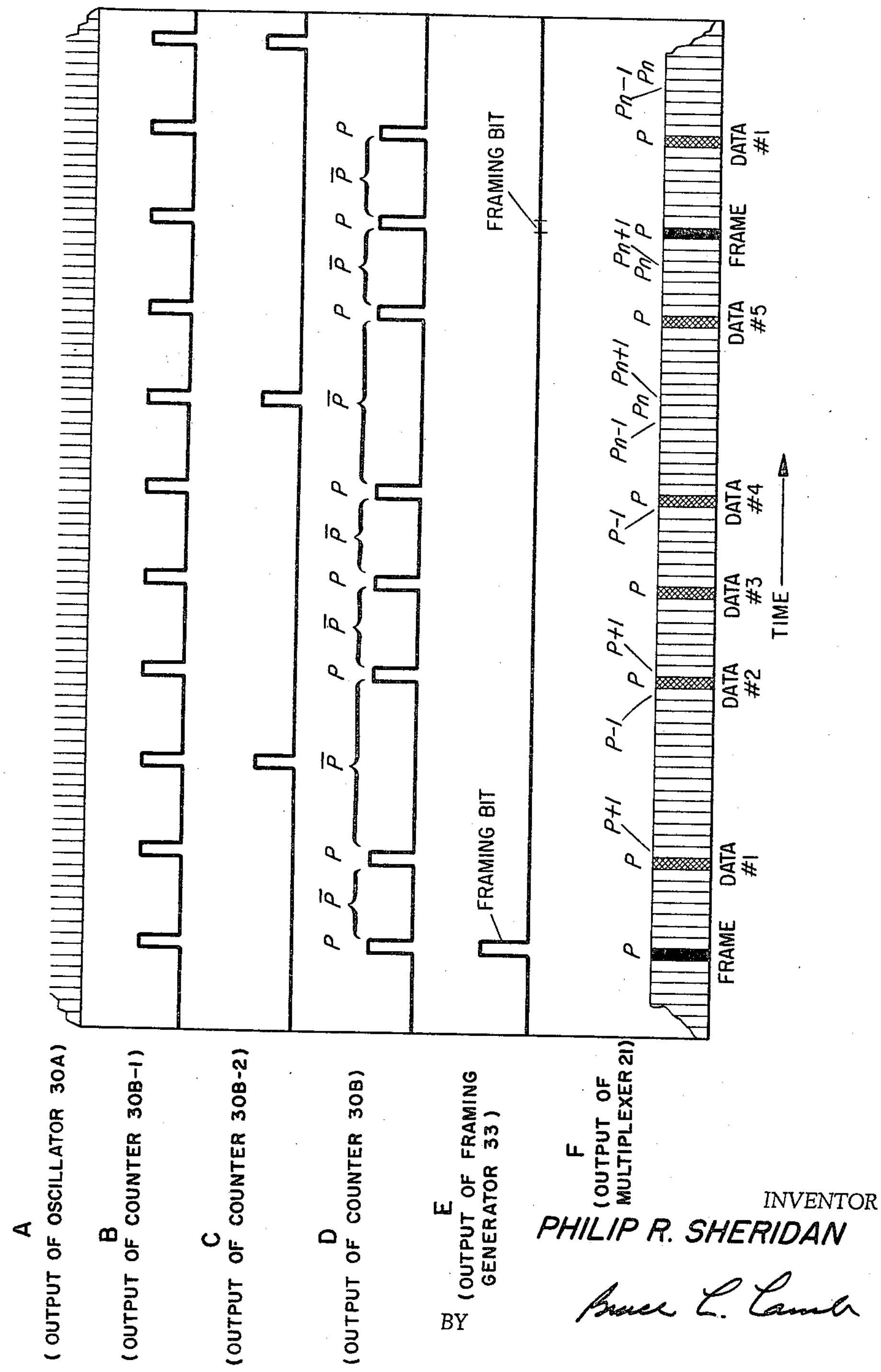
FIG. 2 is a timing diagram of various of the binary streams generated within certain elements of the subject invention.

FIG. 2A illustrates the clock pulses generated by oscillator 30A which are applied to pulse gates 13 and 14 at the sampling rate of 38.4 kHz. and are simultaneously applied to preemption counter 30B. Since the clock pulses are used to trigger flip-flops, as will be apparent from this discussion, the pulses can be of substantially shorter duration than a bit.

Preemption counter 30B includes scale-of-8 counter 30B–1, a scale-of-4 counter 30B–2, inverter 30B–3 and AND gate 30B–4. Counter 30B–1, which may include a binary counter of three flip-flops, generates one output pulse for every eight clock pulses supplied by oscillator 30A. Counter 30B–2, which may include a binary counter of two flip-flops, generates one output pulse for every four pulses supplied by counter 30B–1. Counter 30B–2 output pulses are inverted by inverter 30B–3 so as to disable gate 30B–4, thereby suppressing every fourth output pulse from counter 30B–1. FIG. 2B is a timing diagram of counter 30B–1 output pulses. FIG. 2C is a timing diagram of counter 30B–2 output pulses. These are combined, as aforementioned, by inverter 30B–3 and gate 30B–4 to produce the pulse stream illustrated by FIG. 2D which illustrates counter 30B output pulse stream which is inverted by inverter 36 to produce the preemption pulses applied to multiplexer 21.

As has previously been discussed, framing counter 30C, which includes a scale-of-6 counter, generates a framing generator enabling pulse every sixth preemption pulse. The framing generator is flip-flop feeding a single shot whereby a framing pulse is generated for every second output pulse of framing counter 30C. In essence, the framing bits are alternate "1's" and "0's" spaced at 64 bit intervals. FIG. 2E illustrates framing bits generated by framing generator 33.

Framing bits, digital data bits and the delta modulator output is combined in multiplexer 21 to produce the binary stream illustrated in FIG. 2F. It will be noted that a standard multiplex frame length of 64 bits is generated. Bit rate, as determined by oscillator 30A is 38.4 kHz. Frame rate is 600 frames per second. Analog content is 34.8K bits per second and data content is 3000 bits per second. From the description of the system disclosed it should be apparent, that although framing bits consist of alternate "1's" and "0's", other bits may be at either logical level depending upon the informational content and the prior history of the stream.

Note also that there are six P bits per frame or slightly less than 10% of the total bits in a frame are preempted bits. One P bit per frame is the framing bit, while the other five P bits in a frame contain digital data. The remaining fifty-eight bits in a frame contain the digitized analog signal. Also note that a P bit is proceeded by a $P-1$ bit and followed by a P1 bit and that P*n* is a general term for any bit.

The multiplexed binary stream passes into transmitter 37 which shapes and standardizes the stream and transmits it either by ground wire or radiation to a remote station.

The multiplexed stream is intercepted by receiver 40 which reshapes and standardizes the received stream and routes it to demultiplexer 45. A frame decoder 42, having searched the received signal and identified the framing pulses which, as has been discussed, occur at regular intervals always at alternate logical "1" and "0" levels, synchronizes itself with the framing pulses. Frame decoders and methods of frame decoding are well known in the art and need not be discussed in detail at this time. Briefly, they include circuits similar to those found in clock 30, that is, a slave stable local oscillator generating a frequency identical to the oscillator 30A frequency, counter circuits for producing preemption pulses at the proper time and gates activated by the preemption pulses for routing the digital data and framing pulses. Additionally, the frame decoder might include means slowly processing the position of the preemption pulses in order to search for the framing pulses, threshold circuits for recognizing the acquisition of the framing pulses, and calibration and locking circuits for calibrating the local oscillator to the frequency of oscillator 30A and locking to that oscillator. Information as to the frequency of the oscillator 30A is contained in the framing pulse spacing.

With the frame decoder producing preemption pulses at logical level "0" at time P and at logical level "1" at time $\overline{P}$, demultiplexer 45 is able to separate the multiplexed information from the received stream. At time P, the logical "0" on line 41 disables gate 46, but being inverted by inverter 44, the preemption pulse enables gate 43 allowing the digital data to pass into frame decoder 42 and hence to terminal 50. The recovered stream representing the analog information passes through gate 46 which is enabled at time $\overline{P}$ by the logical "1" on line 41 into shift register 51 including flip-flops 52 and 53. The binary stream enters directly into the set terminal 52A of flip-flop 52 through AND gate 70 and inverted by inverter 55 into RESET terminal 52B through AND gate 71. Clock pulses are supplied to AND gates 70, 71, 72 and 73 from the local oscillator in frame decoder 42. Terminal 52C is connected directly to AND gate 56 and through time delay 60 and gate 72 to the SET terminal 53A of flip-flop 53. Terminal 52D is connected through time delay 61 and gate 73 to RESET terminal 53B. The time delays are each substantially less than 1 bit long so that the bit appearing at terminal 53D of flip-flop 53 is the inverse of the bit which appeared at terminal 52C one bit earlier. In other words, the binary stream entering shift register 51 may be considered to consist of bits P, P1 . . . P—1, P, etc., where P bits are those bits occurring at preemption time P, so that at preemption time P, bit P appears at terminal 52C and bit $\overline{P-1}$, where $\overline{P-1}$ means bit $P-1$ inverted, appears simultaneously at terminal 53D. At time $\overline{P}$, a logical "1" is on preemption line 41 enabling gate 56 and passing the binary stream appearing at terminal 52C into OR gate 59. At time P, the logical "0" on preemption line 41 enables gate 57 through inverter 58, passing the bit appearing at terminal 53D into gate 59. The resultant stream appearing at the output of gate 59 therefore consists of bits . . . $P-2$, $P-1$, $\overline{P-1}$, P1 . . . . This resultant stream is demodulated by integrator 63 and low-pass filter 64 of demodulator 62 to reproduce the original audio signal at output terminal 65.

It will be remembered that the delta modllator output was also forced to complement at time P. The conditions for suppression of the multiplexing tone with minimum distortion have thereby been satisfied; i.e., the delta modulator output signal has been forced to complement at preemption time and the binary input to the demodulator integrator is identical to the binary feedback stream into the delta modulator integrator.

The invention claimed is:

1. In a time division multiplex system including a source of analog signals, means converting said analog signals into a first train of binary bits, said bits occurring at recurrent time intervals, a source of digital data, time multiplexing means periodically sampling said digital data at time P of said recurrent time intervals and said first binary train at time $\overline{P}$ so as to produce a time multiplexed digital stream, a first clock generating pulses defining said first train bit spacing and including a counter generating a first counter signal defining times P and $\overline{P}$, means transmitting said digital stream, means receiving said digital stream, means demultiplexing said received digital stream into said digital data and a second train representing said analog signal, means recovering said digital data including a second clock synchronized with said first clock and a counter generating a second counter signal defining times P and $\overline{P}$, and means demodulating said second train to reproduce said analog signal, an improvement comprising, first means enabled at time P by said first counter signal when defining time P for generating in said first train a bit of opposite sense to said bit generated in said first train at time $P-1$, and second means enabled at time P by said second counter signal when defining time P for generating in said second train a bit of opposite sense to said bit generated in said second train at $P-1$.

2. A time division multiplex system as claimed in claim 1 wherein said second means includes, a two stage storage means, said first stage storing said second train bit $Pn$ and said second stage storing said second train bit $Pn-1$, and means responsive to said second counter signal when defining times P and $\overline{P}$ for sampling said first stage at time $\overline{P}$ and sampling said second stage at time P.

3. A time division multiplex system as claimed in claim 1 wherein said converting means includes an output bistable means generating said first train, means integrating said first train, means comparing said integrated first train with said analog signal, means responsive to said comparison for generating a binary level error signal, and said first means includes gating means enabled at time $\overline{P}$ to allow said output bistable means to generate said first train in response to said error signal, said gating means being so enabled at time P as to cause said output bistable means to complement.

4. A time division multiplex system as claimed in claim 1 with additionally a source of framing pulses, means periodically substituting a framing pulse in said multiplexed stream for one said digital data bit, and means responsive to said demultiplexed digital data for identifying said framing pulses whereby said second clock is synchronized by said framing pulses.

5. A time division multiplex system as claimed in claim 1 wherein said converting means includes a pulse steered flip-flop for generating said first train in response to said analog signal at time $\overline{P}$, and said first means is so enabled at time P as to force said flip-flop to complement.

6. A time division multiplex system as claimed in claim 1 wherein said second means includes, means for storing bit $Pn$, means for storing bit $Pn-1$, means responsive to said second counter signal when defining time $\overline{P}$ for sampling said means for storing bit $Pn$, whereby bits $Pn$ are recovered and responsive to said second counter signal when defining time P for sampling said means for storing bit $Pn-1$, whereby bits $P-1$ are recovered and means combining said recovered bits to produce said second train.

7. A time division multiplex system as claimed in claim 1 wherein said converting means includes a pulse steered flip-flop for generating said first train in response to said analog signal at time $\overline{P}$, said first means is so enabled at time P as to force said flip-flop to complement, and said second means includes, means for storing bit $Pn$, means for storing bit $Pn-1$, means responsive to said second counter signal defining time $\overline{P}$ for sampling said means for storing bit $Pn$ whereby bits $Pn$ are recovered, and responsive to said second counter signal defining time P for sampling said means for storing bit $Pn-1$, whereby bits $P-1$ are recovered, and means combining said recovered bits to produce said second train.

8. A timed division multiplex system as claimed in claim 1 wherein, said converting means includes an output pulse steered flip-flop for generating said first train, means integrating said first train, means comparing said integrated first train with said analog signal, means responsive to said comparison for generating a binary level error signal, and said first means includes first and second gates, said first gate receiving said error signal directly and said second gate receiving said error signal inverted, said first and second gates being additionally responsive to said first counter signal defining times P and $\overline{P}$ and being so connected to said pulse steered flip-flop as to drive said flip-flop at time $\overline{P}$ to a logical "1" output level when said analog signal exceeds said integrated feedback signal and to drive said flip-flop to logical level "0" when said integrated feedback exceeds said analog signal, and at time P driving said flip-flop to complement.

9. A time division multiplex system as claimed in claim 1 wherein, said first means includes a gating means enabled at time $\overline{P}$ by said first counter signal when defining time $\overline{P}$ to allow said first train to be generated by said converting means in response to said analog signal, said gating means being so enabled at time P by said first counter signal when defining time P as to force said first train to complement, and said second means includes a two stage shift register, said first stage storing said second train bit $Pn$ and said second stage storing said second train bit $Pn-1$, bit $Pn-1$ occurring in the time interval immediately prior to bit $Pn$.

10. A time division multiplex system as claimed in claim 9 wherein, said second means additionally includes a means responsive to said second counter signal defining times P and $\overline{P}$ for sampling said first stage at time $\overline{P}$ and sampling said second stage at time P.

References Cited

UNITED STATES PATENTS

| | | | |
|---|---|---|---|
| 3,091,664 | 5/1963 | Tyrlick | 179—15 |
| 3,372,237 | 3/1968 | Hackett | 179—15 |

RALPH D. BLAKESLEE, Primary Examiner

ALBERT B. KIMBALL, JR., Assistant Examiner

U.S. Cl. X.R.

325—38